US012553068B2

(12) United States Patent
Breton et al.

(10) Patent No.: US 12,553,068 B2
(45) Date of Patent: Feb. 17, 2026

(54) METHOD OF FRACTIONATION OF FATTY ACIDS WITH A DIFFERENCE OF TWO CARBONS BY MOLECULAR DISTILLATION

(71) Applicant: POLARIS, Quimper (FR)

(72) Inventors: Gildas Breton, Quimper (FR); Lionel Larvol, Quimper (FR); Louis-Marie Martin, Quimper (FR)

(73) Assignee: POLARIS, Quimper (FR)

( * ) Notice: Subject to any disclaimer, the term of this patent is extended or adjusted under 35 U.S.C. 154(b) by 692 days.

(21) Appl. No.: 17/914,086

(22) PCT Filed: Mar. 25, 2021

(86) PCT No.: PCT/EP2021/057824
§ 371 (c)(1),
(2) Date: Sep. 23, 2022

(87) PCT Pub. No.: WO2021/191385
PCT Pub. Date: Sep. 30, 2021

(65) Prior Publication Data
US 2023/0151297 A1    May 18, 2023

(30) Foreign Application Priority Data

Mar. 27, 2020 (FR) ...................... 2003018

(51) Int. Cl.
*C12P 7/6472* (2022.01)
*C11C 1/10* (2006.01)
*C11C 3/00* (2006.01)
*C12N 9/20* (2006.01)

(52) U.S. Cl.
CPC .............. *C12P 7/6472* (2013.01); *C11C 1/10* (2013.01); *C11C 3/003* (2013.01); *C12N 9/20* (2013.01)

(58) Field of Classification Search
CPC .......... C12P 7/6472; C11C 1/10; C11C 3/003; C12N 9/20; C12N 1/12; C12N 1/125; C12R 2001/89; A23L 33/12; A61K 31/202
See application file for complete search history.

(56) References Cited

U.S. PATENT DOCUMENTS

2013/0292242 A1  11/2013  Hietsch et al.

FOREIGN PATENT DOCUMENTS

| CN | 107216252 A | 9/2017 | |
| WO | 00/73254 A1 | 12/2000 | |
| WO | 2011/092299 A1 | 8/2011 | |
| WO | WO-2017062523 A2 * | 4/2017 | ............... A23C 9/00 |

OTHER PUBLICATIONS

Hadley et al.; "The oil-rich alga Schizochytrium sp. as a dietary source of docosahexaenoic acid improves shape discrimination learning associated with visual processing in a canine model of senescence;" Prostaglandins, Leukotrienes and Essential Fatty Acids; 2017; pp. 10-18; vol. 118.
Jun. 17, 2021 Search Report issued in International Patent Application No. PCT/EP2021/057824.
Sep. 22, 2022 International Preliminary Report on Patentability issued in International Patent Application No. PCT/EP2021/057824.

* cited by examiner

*Primary Examiner* — Deborah D Carr
(74) *Attorney, Agent, or Firm* — Williams Mullen; R. Brian Drozd

(57) ABSTRACT

A method for the fractionation of fatty acids with a difference of two carbons by molecular distillation with double pass fractionation between eicosapentaenoic and docosahexaenoic acids, and compositions of microorganism oils enriched in eicosapentaenoic or docosahexaenoic acid. The method wherein (i) a reaction step between an microorganism oil including omega-3 polyunsaturated fatty acids in triglyceride form and an alcohol in the presence of a chemical or enzymatic catalyst, (ii) a first step of molecular distillation under high vacuum of the oil from step (i), in a scraper film evaporator coupled to a rectification column including at least seven theoretical plates, and recovery of a first residue and distillate, (iii) a second step of molecular distillation under high vacuum of the step (ii) residue, in the scraper film evaporator, and recovery of a second residue and distillate.

13 Claims, No Drawings

METHOD OF FRACTIONATION OF FATTY ACIDS WITH A DIFFERENCE OF TWO CARBONS BY MOLECULAR DISTILLATION

The invention relates to a method for the fractionation of fatty acids with a difference of two carbons by double-pass molecular distillation, in particular for fractionation between eicosapentaenoic acid and docosahexaenoic acid, as well as to compositions of oils of microorganisms enriched in eicosapentaenoic acid or in docosahexaenoic acid obtained by such a method.

For several years now, it has been recommended to enrich your diet with polyunsaturated fatty acids because of their proven beneficial role in many physiological reactions and pharmaceutical functions.

Among the polyunsaturated fatty acids of interest, there are those belonging to the omega-3 family such as eicosapentaenoic acid (EPA) and docosahexaenoic acid (DHA) and those belonging to the omega-6 family such as arachidonic acid (ARA).

DHA and EPA have been the subject of numerous physiological studies and their essential role in babies, children and adults is now known. EPA is well known for these anti-inflammatory effects via its oxygenated derivatives. It also has a well recognised therapeutic activity against cardiovascular diseases. DHA is known for its essential role in the development of the brain and of the retina and in the preservation of cognitive functions.

EPA and DHA can be taken into the body through a diet of marine origin, with regular consumption of fish. However, the quantity of fish to be consumed must be large to obtain the expected therapeutic effects.

One way to increase the intake of polyunsaturated fatty acids is by consuming food supplements or concentrates based on fish oil. These products come in the form of natural oils or oils concentrated in DHA or EPA in the form of triglycerides or in the form of ethyl esters.

However, with the growing demand for polyunsaturated fatty acids, fish oils can no longer serve as the sole source. In addition, they have taste and odour characteristics that are unpleasant for many consumers, and potentially high cholesterol levels. Finally, there is an irregularity in terms of fatty acid production depending on the season.

It has become necessary to identify alternatives to fish oils and to find other sources for the production of fatty acids.

Microalgae also have high levels of polyunsaturated fatty acids and therefore represent an interesting alternative source. Some of them can produce quantities of polyunsaturated fatty acids representing up to 40 to 50% of their biomass. In addition, they have the advantage of being able to be cultivated under controlled conditions. Marine microalgae do not have the negative odour and taste characteristics of fish oils. They also do not produce cholesterol.

For example, microalgae belonging to the genus *Thraustochytrium* or *Schizochytrium* are rich sources of long-chain omega-3 polyunsaturated fatty acids. Some can in particular produce between 20% and 35% docosahexaenoic acid, or even more, by total weight of fatty acids (Hadley et al, 2017) (Hammond et al, 2001).

Such microalgae are now beginning to be used for the production of compositions enriched in DHA.

Sources capable of producing EPA include marine bacteria, such as *Shewanella* sp, but culture conditions make it difficult for them to be commercially exploited. Mushrooms of the genus *Mortierella* sp are also found, but the yields are not yet consistent with industrial production.

To date, for producing EPA, microorganisms are cultivated under photoautotrophic conditions, i.e. conditions that require light for growth.

EPA produced by photoautotrophy is incorporated into membrane lipids, either in the form of glycolipids, mono-(MGDG) or di-galactosyl diacylglycerol (DGDG) or sulfoquinovosyl diacylglycerol (SQDG), or in the form of phospholipids, phosphatidyl glycerol, phosphatidyl choline or phosphatidyl ethanolamine, or in the form of free fatty acids. The triglyceride form is poorly represented.

However, autotrophic culture of microorganisms in open ponds is unsuitable for industrial and intensive exploitation. In addition, the extraction of lipids containing EPA is a lengthy step and low in terms of yield.

An alternative to autotrophic culture is heterotrophic culture. This allows the production of biomass in closed reactors and in large quantities. To date, this method is used to provide biomass as a source of DHA. For example, strains of *Schizochytrium* sp. are well known for producing oils in the form of triglycerides containing more than 40% DHA. Extraction of triglycerides is relatively simple and takes place by enzymatic breakdown of the cell wall directly in the fermenter without going through an expensive phase of drying the biomass for lipid extraction. The main production cost remains sugar, which is the carbon source.

Certain varieties of microalgae, such as those of the *Thraustochytrium* and *Schizochytrium* genera, although sought after mainly for their DHA content, may also contain significant amounts of EPA in the form of triglycerides.

It would therefore be desirable to be able to concentrate, from these oils, on the one hand EPA and on the other hand DHA in order to obtain, separately, fractions enriched in DHA and fractions enriched in EPA. To do this, it is necessary to take into account the separating capacities of the production methods. In fact, EPA and DHA are structurally distinguished, in particular by a shadow of two carbon atoms, EPA containing 20 carbon atoms and DHA containing 22. It is therefore difficult to separate these two compounds.

One aim of the invention is thus to propose a method for the fractionation of fatty acids with a difference of two carbons, in particular for fractionation between eicosapentaenoic acid and docosahexaenoic acid.

To this end, the invention relates to the fractionation of fatty acids with a difference of two carbons by molecular distillation, in particular fractionation between eicosapentaenoic acid and docosahexaenoic acid, characterised in that it comprises:

(i) a step of reaction between an oil of microorganisms comprising omega-3 polyunsaturated fatty acids in the form of triglycerides and an alcohol in the presence of a chemical or enzymatic catalyst, (ii) a first step of molecular distillation under high vacuum of the oil resulting from the step (i), in a scraper film evaporator coupled to a rectification column comprising at least seven theoretical plates, and recovery of a first residue and of a first distillate, (iii) a second step of molecular distillation under high vacuum of the residue recovered in the step (ii), in said scraper film evaporator coupled to the rectification column comprising at least seven theoretical plates, and recovery of a second residue and of a second distillate.

The method according to the invention allows the separation and concentration of EPA and DHA. The second residue obtained contains EPA and the second distillate contains DHA.

The method therefore makes it possible to obtain compositions enriched in EPA on the one hand, and compositions enriched in DHA on the other hand.

As the following example will demonstrate, the method according to the invention has good profitability in terms of EPA and DHA concentration, and is perfectly compatible with industrial implementation.

Thus the starting oil is an oil that has been obtained from microorganisms cultivated under heterotrophic conditions. Omega-3 polyunsaturated fatty acids are found in the form of triglycerides, i.e. esterified on the glycerol skeleton. One method of concentrating these fatty acids then consists first of all in freeing them of the glycerol.

The step (i) of reaction between the oil and an alcohol in the presence of a catalyst is a transesterification step that will enable the fatty acids to be obtained in the form of ethyl esters (EE).

Preferably, the transesterification reaction is carried out with ethanol as alcohol and sodium ethylate as catalyst.

This reaction is carried out at a temperature between 40 and 120° C., preferentially between 40 and 60°, for a time between 1 and 12 h, preferentially between 1 and 2 h.

At the end of the reaction, almost 100% of the fatty acids are in the form of ethyl esters.

The fatty acid ethyl esters formed can then be distilled by molecular distillation to collect therefrom the concentrated fraction of polyunsaturated fatty acids during the step (ii).

Distillation under high vacuum allows the separation of ethyl esters according to their volatility. This depends on their molecular weight and the length of the fatty acid chains.

This step will make it possible to eliminate as much as possible the fatty acids the chain of which contains less than 20 carbon atoms.

Importantly, the molecular distillation is carried out in a scraper film evaporator coupled to a rectification column comprising at least seven theoretical plates. The use of the rectification column with a maximum of seven plates avoids any oxidative deterioration of EPA and DHA and the parameters applied should prevent the risk of isomerisation of the EPA or DHA.

The distillation parameters are therefore as follows:
Distillation vacuum from 0.01 to 0.20 mbar, preferentially less than 0.1 mbar,
Temperature in the scraper film evaporator from 190 to 240°, preferentially 225° C.,
Temperature in the bottom of the column from 160 to 200° C., preferentially 190° C.,
Temperature in the top of the column from 130 to 200° C., preferentially 135° C.

This first concentration step therefore makes it possible to obtain a residue rich in long-chain fatty acid esters and a distillate rich in short-chain fatty acid esters. This first step of molecular distillation is not selective enough to fractionate fatty acids that have simply a difference of two carbons, such as DHA and EPA. The residue therefore comprises EPA and DHA, generally in a respective content of 20% and 50%, by weight.

Thus, so as to separate the EPA and the DHA, into two distinct fractions and each usable, the residue from the step (ii) is reinjected into the scraper film evaporator coupled to the rectification column comprising at least seven theoretical plates for a second concentration step by molecular distillation (iii).

During this second step of concentration by molecular distillation (iii) the distillation temperatures are adjusted in order to distil a maximum of EPA.

The distillation parameters are therefore as follows:
Distillation vacuum from 0.01 to 0.10 mbar, preferentially less than 0.05 mbar,
Temperature in the scraper film evaporator from 190 to 245°, preferentially 235° C.,
Temperature in the bottom of the column from 160 to 210° C., preferentially 202° C.,
Temperature in the top of the column from 130 to 200° C., preferentially 160° C.

This second concentration step therefore makes it possible to obtain a residue rich in DHA and a distillate rich in EPA.

Thus, at the end of the method according to the invention, a fraction containing at least 600 mg/g of EPA ethyl esters on the one hand and a fraction containing at least 600 mg/g of ethyl esters is therefore obtained.

According to one embodiment of the invention, the method further comprises, optionally:
(iv) a step of restructuring monoglycerides, diglycerides and triglycerides of omega-3 polyunsaturated fatty acids in the presence of enzyme and glycerol,
(v) a step of short-path molecular distillation under vacuum.

This is because, optionally, the fatty acid ethyl esters contained in the residue rich in DHA and in the distillate rich in EPA obtained after the step (iii) can then be converted during a step (iv) of re-esterification in the form of triglycerides, monoglycerides and diglycerides.

Preferentially, the enzyme used during this step is a lipase, advantageously a *Candida antarctica* lipase B.

This re-esterification reaction is carried out at a temperature between 40 and 60° C., for a time between 15 and 30 h, preferentially between 20 and 25 h.

The step (iv) of restructuring the monoglycerides, diglycerides and triglycerides is then followed by a step (v) of short-path molecular distillation under high vacuum to eliminate the residual ethyl esters and the volatile odorous compounds but also to inactivate a potential residual enzymatic activity. This step makes it possible to further concentrate the composition in monoglycerides, diglycerides and triglycerides.

According to one embodiment, the method according to the invention further comprises a (vi) addition of antioxidants.

The step (vi) of adding antioxidants is also an optional step that aims to improve the oxidation resistance of the composition. Antioxidants such as ascorbyl palmitate, rosemary extract, phospholipids, tocopherol or any other antioxidant known to those skilled in the art can be used.

Advantageously, the oil of the microorganisms of the step (i) comes from microalgae of the genus *Thraustochytrium, Schizochytrium, Nannochloropsis, Isochrysis, Phaeodactylum, Nitzchia, Staurosira, Crypthecodinium* or *Ulkenia*, preferentially of the genus *Schizochytrium*.

The method according to the invention therefore makes it possible to obtain oils from microorganisms enriched in omega-3 polyunsaturated fatty acids in a novel way and responds to the problem of diversifying the supply, profiles and qualities of oils.

The invention thus also relates, according to a first embodiment, to an oil composition of microorganisms enriched in polyunsaturated fatty acids, capable of being obtained by the method described above, and which is characterised in that it has:
an eicosapentaenoic acid content greater than or equal to 600 mg/g of composition,
a docosahexaenoic acid content of less than or equal to 90 mg/g of composition.

This composition corresponds to the second distillate obtained at the end of the fractionation method according to the invention, after performing the two molecular distillation steps.

Advantageously, the composition comprises an eicosapentaenoic acid content greater than or equal to 650, preferentially to 700 mg/g of composition.

Advantageously, the composition also has:
an arachidonic acid content of less than or equal to 60 mg/g of composition.

The degradation of long-chain fatty acids results in the formation of metabolites that affect mechanisms such as coagulation, inflammation and immunity. The degradation of arachidonic acid through lipoxygenases and cycloxygenases produces derivatives such as leukotrienes and proinflammatory prostaglandins while the degradation of eicosapentaenoic acid results in anti-inflammatory compounds. Arachidonic acid (ARB) can therefore be considered an EPA antagonist. This is why the composition according to the invention has an advantageous profile since its EPA content is high and that of ARA is low.

Advantageously again, the composition additionally has:
an omega-3 docosapentaenoic acid (DPA n-3) content greater than the omega-6 docosapentaenoic acid (DPA n-6) content.

Though polyunsaturated fatty acids belonging to the omega-3 family have been the subject of numerous studies and scientific publications for several years, the latter actually only mainly concerned EPA and DHA. Today, the interest of the scientific community is turning to other omega-3s, which probably have key independent roles in many physiological mechanisms. This is, for example, the case with omega-3 docosapentaenoic acid (DPA). This fatty acid is starting to be the subject of a few studies and appears to be interesting from a nutritional point of view, especially for its action on cholesterol.

In addition, omega-6 docosapentaenoic acid (DPAn-6) is a fatty acid found in the brain in cases of DHA deficiency. Its molecular conformation is very similar to DHA and can then take the place of DHA without having the effects. It is an unwanted fatty acid.

The invention thus also relates, according to a second embodiment, to an oil composition of microorganisms enriched in polyunsaturated fatty acids, capable of being obtained by the method described above and which is characterised in that it has:
a docosahexaenoic acid content greater than or equal to 600 mg/g of composition,
a eicosapentaenoic acid content less than or equal to 90 mg/g of composition.

Advantageously, the composition comprises a docosahexaenoic acid content greater than or equal to 650, preferentially greater than 700 mg/g of composition.

This composition corresponds to the second residue obtained at the end of the fractionation method according to the invention.

Advantageously again, the composition according to the second embodiment has a ratio between omega-3 docosapentaenoic acid (n-3 DPA) and eicosapentaenoic acid (EPA) greater than or equal to 1.

Advantageously again, the composition has an omega-3 docosapentaenoic acid (n-3 DPA) content greater than or equal to 85 mg/g of composition.

For targeted application to the brain, it is advantageous to add omega-3 docosapentaenoic acid (n-3 DPA) because this acid can be considered as a form of storage for producing DHA. In addition, DPA has a role in neuroprotection and is the precursor of lipid mediators, for example oxygenated derivatives such as resolvins and neuroprotectins-DPAn-3. Supplementing with n-3 DPA can also act on platelet aggregation, on blood triglyceride levels and cholesterol, and lower risk of cardiovascular disease.

Advantageously again, the composition also has:
an omega-3 docosapentaenoic acid (n-3 DPA) content greater than the omega-6 docosapentaenoic acid (n-6 DPA) content.

The invention also relates, according to a third embodiment, to an oil composition of microorganisms enriched in polyunsaturated fatty acids, capable of being obtained by the method described above, and which is characterised in that it contains, as a percentage relative to the total amount of fatty acids:
20% eicosapentaenoic acid
50% docosahexaenoic acid
at least 5% omega-3 docosapentaenoic acid This composition corresponds to the first residue obtained at the end of step (ii) of the fractionation method according to the invention.

Preferentially, the polyunsaturated fatty acids are in the form of ethyl esters in the compositions according to the first, second and third embodiments.

Alternatively, the polyunsaturated fatty acids are in the form of glycerides in the compositions according to the first, second and third embodiments.

The triglyceride form is obtained only when the method according to the invention comprises the steps (iv) and (v) mentioned above.

The aforementioned compositions, that is to say those enriched in EPA and those enriched in DHA, can be mixed together in order to provide mixtures with varying ratios of DHA and EPA. These mixtures are interesting because, depending on the nutritional and physiological applications sought, the requirements for DHA and EPA vary.

For preparing these mixtures, the fractions are mixed and diluted in an oil free from DHA and EPA. It will preferentially be a vegetable oil, such as an oleic sunflower oil.

Thus the invention also relates to an oil composition of microorganisms enriched in polyunsaturated fatty acids comprising and having a ratio between eicosapentaenoic acid and docosahexaenoic acid selected from the following: 10%/65%-15%/65%-20%/55%-25%/50%-30%/45%-38%/38%-45%/30%-50%/25%-58/20%-65%/10%-70%/8%.

Any other ratio can of course be envisaged and achieved, after dilution in an oil devoid of DHA and EPA, such as: 5%/60%; 10%/40%; 10%/50%; 30%/30%; 40%/20%; 40%/30%; 45%/10%; 50%/25%; 55%/10%; 60%/10%; 60%/5%.

Advantageously, these mixture compositions have an arachidonic acid content of less than or equal to 60, as a percentage relative to the total amount of fatty acids, and an omega-3 docosapentaenoic acid content greater than the omega-6 docosapentaenoic acid content.

Advantageously, the compositions according to the invention are in the form of a food supplement or a pharmaceutical, nutraceutical or food composition, in particular for children.

The invention will be better understood on reading the examples which follow.

EXAMPLE 1: EPA/DHA FRACTIONATION BY MOLECULAR DISTILLATION AND OBTAINING OIL COMPOSITIONS OF MICROORGANISMS ENRICHED IN EICOSAPENTAENOIC ACID AND DOCOSAHEXAENOIC ACID

This example illustrates the method according to the invention and is implemented using an untreated oil produced by the microalgae strain *Schizochytrium* sp marketed by the company DSM under the trade mark Life's DHA 60.

The profile of the oil is as follows:
360 mg/g of DHA, in mg/g of composition,
184 mg/g EPA, in mg/g of composition,
94.10 triglycerides,
5.40 diglycerides,
0.40 monoglycerides.

The objective here is at a minimum double the concentration of EPA and DHA.

Step (i): Transesterification

A transesterification reaction is carried out on a biomass of 19 kg of microalgal oil using 4.75 kg of ethanol and 222 g of sodium ethylate, in a suitable reactor.

The reaction temperature is 50° C. and the reaction time is 1 hour. At the end of the reaction, the excess ethanol is evaporated under vacuum, then the mixture is cooled to a temperature of about 30° C. and then subjected to settling for 1 hour. The light phase is recovered and then the glycerol is drained off. A second settling is carried out for 30 sec. The glycerol and the residual monoglycerides are drained off.

Washing with acidic water is then carried out by adding 3.2 kg of demineralised water containing 76.4 g of phosphoric acid (75%) with stirring for 20 sec. The mixture is settled for 20 sec. and the aqueous phase is drained off. Drying under vacuum (pressure <90 mbar) at 60° C. for a time greater than 2 hours follows.

At the end of this step the oil contains 192 mg/g of EPA and 374 mg/g of DHA in the form of ethyl esters.

Step (ii): First Molecular Distillation Step

The oil is then passed through a degasser and then passes through a scraper film evaporator. The vapours are then distilled through a rectification column that is coupled to the evaporator supplied by the company UIC GmbH. The goal here is to remove the lightest fatty acids while retaining DHA and EPA. The column used contains seven theoretical plates. The distillation residue is recovered and represents the fraction enriched in EPA and DHA.

The operating conditions are as follows: T° of the evaporator: 225° C.; Rectification column vacuum: less than 0.1 mbar; Reflux rate 70%, T° (bottom of column): 190° C., T° (top of column): 135° C.

At the end of this step, a residue fraction and a distillate fraction are obtained. The residue fraction contains 256 mg/g of EPA and 520 mg/g of DHA. The yield is 68%.

Step (iii): Second Molecular Distillation Step

The operation of step (II) is repeated on the residue. This is therefore returned to the degasser and then passes through the scraper film evaporator. The vapours are then distilled through the rectification column coupled to the evaporator as in the case of step (ii) above. The aim here is to separate the DHA and the EPA.

The operating conditions are as follows: T° of the evaporator: 235° C.; Rectification column vacuum: less than 0.05 mbar; Reflux rate 60%, T° (bottom of column): 202° C., T° (top of column): 160° C.

At the end of this step, a residue fraction and a distillate fraction are obtained. The distillate fraction contains 733 mg/g of EPA and 70 mg/g of DHA. The yield of this fraction is 84% in EPA and 4% in DHA. The residue fraction contains 706 mg/g DHA and 83 mg/g EPA. The yield of this fraction is 93% in DHA and 22% in EPA.

In Table 1 below, the detailed fatty acid profile of the distillate and residue fractions obtained at the end of step (iii) is indicated (in mg/g of composition).

TABLE 1

|  | DISTILLATE | RESIDUE |
|---|---|---|
| C14:0 | 0 | 0 |
| C15:0 | 0 | 0 |
| C16:0 | 5.3 | 0 |
| C18:0 | 13.5 | 0 |
| C18:1 n9 cis | 27.6 | 0 |
| C18:2 n6 cis | 2.6 | 0 |
| C20:0 | 12.2 | 3.5 |
| C20:3 n6 | 2.1 | 0.3 |
| C21:0 | 5.0 | 0 |
| C20:1 n7 | 0.0 | 0.3 |
| C20:4 n6 | 54.9 | 4.4 |
| C20:3 n3 | 5.9 | 0 |
| UNKNOWN | 0.0 | 0 |
| UNKNOWN | 1.8 | 0.8 |
| C20:4 n3 | 22.4 | 3.7 |
| EPA | 733.4 | 83.2 |
| C22:0 | 0 | 2.6 |
| UNKNOWN | 5.0 | 5.2 |
| C22:4 n6 | 0.0 | 0 |
| C22:5 n6 | 4.4 | 30.7 |
| UNKNOWN | 0.0 | 1.8 |
| C22:5 n3 | 5.9 | 85.3 |
| DHA | 70.1 | 730 |

The invention claimed is:

1. A method for the fractionation of fatty acids with a difference of two carbons by molecular distillation, the method comprising:
    (i) a step of reaction between an oil of microorganisms comprising omega-3 polyunsaturated fatty acids in the form of triglycerides and an alcohol in the presence of a chemical or enzymatic catalyst,
    (ii) a first step of molecular distillation under high vacuum of the oil resulting from the step (i), in a scraper film evaporator coupled to a rectification column comprising at least seven theoretical plates, and recovery of a first residue and of a first distillate,
    (iii) a second step of molecular distillation under high vacuum of the residue recovered in the step (ii), in said scraper film evaporator coupled to the rectification column comprising at least seven theoretical plates, and recovery of a second residue and of a second distillate.

2. The method according to claim 1, wherein the distillation parameters of the step (ii) are as follows:
    Distillation vacuum from 0.01 to 0.20 mbar
    Temperature in the scraper film evaporator from 190 to 240°,
    Temperature in the bottom of the column from 160 to 200° C.,
    Temperature in the top of the column from 130 to 200° C.

3. The method according to claim 1, wherein the distillation parameters of the step (iii) are as follows:
    Distillation vacuum from 0.01 to 0.10 mbar,
    Temperature in the scraper film evaporator from 190 to 245° Temperature in the bottom of the column from 160 to 210° C.,
    Temperature in the top of the column from 130 to 200° C.

4. The method according to claim 1, further comprising:
    (iv) a step of restructuring monoglycerides, diglycerides and triglycerides of omega-3 polyunsaturated fatty acids in the presence of enzyme and glycerol,
    (v) a short-path molecular distillation step under vacuum.

5. An oil composition of microorganisms enriched in polyunsaturated fatty acids obtained by the method described in claim 1, wherein the oil composition has:
    an eicosapentaenoic acid content greater than or equal to 600 mg/g of composition, a docosahexaenoic acid content of less than or equal to 90 mg/g of composition, an arachidonic acid content of less than or equal to 60 mg/g of composition.

6. The composition according to claim 5, wherein the oil composition has an eicosapentaenoic acid content greater than or equal to 650 mg/g of composition.

7. The composition according to claim 5, wherein the oil composition also has an omega-3 docosapentaenoic acid content greater than the omega-6 docosapentaenoic acid content.

8. An oil composition of microorganisms enriched in polyunsaturated fatty acids, obtained by the method described in claim 1, wherein the oil composition has:

a docosahexaenoic acid content greater than or equal to 600 mg/g of composition, a content of eicosapentaenoic acid less than or equal to 90 mg/g of composition, an omega-3 docosapentaenoic acid (n-3 DPA) content greater than or equal to 85 mg/g of composition.

9. The composition according to claim 8, wherein the oil composition has a docosahexaenoic acid content greater than or equal to 650 mg/g of composition.

10. The composition according to claim 8, wherein the oil composition also has a ratio between omega-3 docosapentaenoic acid and eicosapentaenoic acid greater than or equal to 1.

11. The composition according to claim 5, wherein the polyunsaturated fatty acids are in the form of ethyl esters.

12. The composition according to claim 5, wherein the polyunsaturated fatty acids are in the form of glycerides.

13. The composition according to claim 5, wherein the oil composition is in the form of a food supplement or a pharmaceutical, nutraceutical or food composition for children.

* * * * *